US 6,650,504 B2

(12) United States Patent  (10) Patent No.: US 6,650,504 B2
Ridl  (45) Date of Patent: Nov. 18, 2003

(54) DATA STORAGE TAPE CARTRIDGE WITH TAPE REEL CENTERING BRAKE ASSEMBLY

(75) Inventor: Peter A. Ridl, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 293 days.

(21) Appl. No.: 09/852,331

(22) Filed: May 9, 2001

(65) Prior Publication Data

US 2002/0167760 A1 Nov. 14, 2002

(51) Int. Cl.[7] .............................................. G11B 23/107
(52) U.S. Cl. ..................................... 360/132; 242/338.1
(58) Field of Search ....................... 360/132; 242/338.1, 242/343, 343.1

(56) References Cited

U.S. PATENT DOCUMENTS 5,734,540 A 3/1998 Jacobs et al.
6,452,747 B1 * 9/2002 Johnson et al. ............. 360/132

FOREIGN PATENT DOCUMENTS

EP 0 588 219 A2 3/1994
EP 0 924 701 A2 6/1999
WO WO 97/15925 5/1997

* cited by examiner

Primary Examiner—Craig A. Renner
(74) Attorney, Agent, or Firm—Eric D. Levinson

(57) ABSTRACT

A data storage tape cartridge including a housing, a tape reel assembly, a brake body, a spring, and a storage tape. The tape reel assembly includes a hub, opposing top and bottom flange components, brake teeth, and an inner surface. The inner surface is formed by the tape reel assembly and defines an engagement section apart from the brake teeth. The brake body includes a stem, a head, a toothed section, and a centering feature. The centering feature extends radially outwardly from the head and forms a circumferential edge that is radially spaced from the toothed section. A spring is positioned about a post formed by the cover to bias the brake body to a locked state. In the locked state, the toothed section engages the brake teeth to prevent rotation of the tape reel assembly. Interaction between the circumferential edge and the engagement section limits lateral shifting of the tape reel assembly relative to the tape reel opening when the data storage tape cartridge is vertically oriented.

12 Claims, 4 Drawing Sheets

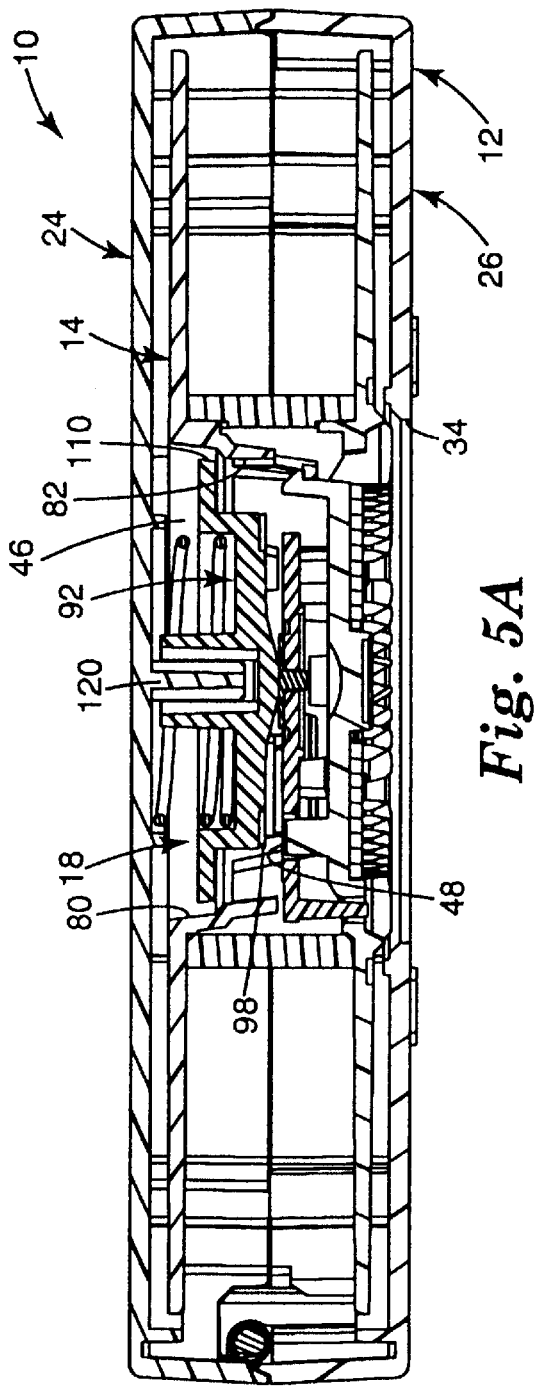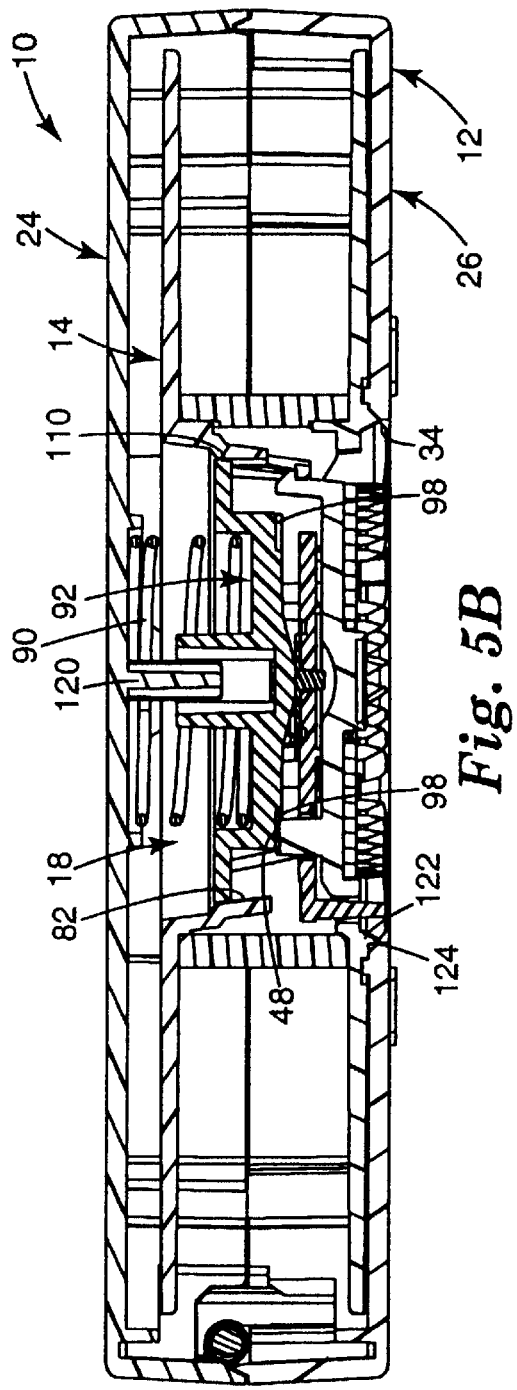

DATA STORAGE TAPE CARTRIDGE WITH TAPE REEL CENTERING BRAKE ASSEMBLY

BACKGROUND OF THE INVENTION

The present invention relates to a data storage tape cartridge. More particularly, it relates to a data storage tape cartridge configured to support a tape reel assembly in a center position relative to an opening formed by a housing when the tape reel assembly is in a locked state.

Data storage tape cartridges have been used for decades in the computer, audio, and video fields. The data storage tape cartridge continues to be an extremely popular form of recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel assembly and is driven through a defined tape path by a driving system. The housing normally includes a separate cover and base, the combination of which forms an opening (or window) at a forward portion thereof for allowing access to the storage tape by a read/write head upon insertion of the data storage tape cartridge into a tape drive. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, a single tape reel assembly is normally employed. Conversely, where the tape cartridge/drive system is configured to provide head/storage tape interaction within or very near the housing, a two- or dual-tape reel assembly configuration is typically utilized.

Regardless of the number of tape reel assemblies associated with a particular data storage tape cartridge, the tape reel assembly itself is generally comprised of three basic components; namely, an upper flange, a lower flange, and a hub body. The hub body forms an outer, tape-winding surface about which the storage tape is wound. The flanges are disposed at opposite ends of the hub, and are spaced to approximate the height of storage tape. Finally, the tape reel assembly forms drive teeth that are engaged by corresponding teeth of a drive chuck for rotating the tape reel assembly upon insertion into a tape drive.

Upon final assembly, the tape reel assembly is generally aligned with a circular tape reel opening formed through the housing (typically in the base section). This tape reel opening is sized to allow interaction between the tape drive chuck and the drive teeth associated with the tape reel assembly. When the data storage tape cartridge is not in use, the tape reel assembly is typically "locked" or otherwise prevented from undesirably rotating. To this end, a brake assembly is provided for each tape reel assembly. The brake assembly can assume a wide variety of forms, such as multiple brake bodies biased to selectively engage an outer circumference of the tape reel assembly. A more common, less expensive approach includes a single brake body and a spring disposed within a central bore of the tape reel assembly. The brake body is slidably associated with a protrusion or post formed by the housing cover opposite the tape reel opening. Further, the spring biases the brake body into engagement with the tape reel assembly, such that the brake body rigidly connects the tape reel assembly with the cover via the post. For example, the brake body can form a toothed surface configured to engage interior brake teeth formed by the tape reel assembly. In this locked position, then, the tape reel assembly is "locked" to the housing cover, and thus will not rotate.

The above-described brake assembly has proven to be highly effective in preventing tape reel rotation when the data storage tape cartridge is not in use. However, the brake assembly only generally aligns the tape reel assembly relative to a center axis of the tape reel opening. Manufacturing tolerances associated with the various cartridge components inherently allows the tape reel assembly to laterally move or shift within the housing. This potential concern is exacerbated when the cartridge is maneuvered from a horizontal orientation. For example, handling and/or storage of the cartridge commonly requires that the cartridge be turned on its side (i.e., vertically oriented). As part of this movement, or when vertically oriented for an extended period of time, the tape reel assembly may laterally move or shift within the housing such that the tape reel assembly is no longer aligned with the tape reel opening. In the event of a relatively substantial lateral shift, the tape drive chuck may experience difficulties in engaging the drive teeth of the tape reel assembly during subsequent use.

More recent data storage tape cartridge designs have attempted to solve the above-described centering concern by forming a chamfered edge in the housing base at the tape reel opening. The bottom flange associated with the tape reel assembly includes an angled protrusion that contacts the chamfered edge in the locked position, in theory centering the tape reel assembly relative to the tape reel opening. Unfortunately, product specifications limit the allowable spring force provided by the brake assembly spring. As such, the angled protrusion associated with the bottom flange readily slides or slips along the chamfered edge. Thus, the tape reel assembly will still transversely or lateral move or shift when the cartridge is vertically oriented.

Data storage tape cartridges are important tools used to maintain vast amounts of information. As the cartridge and drive components continue to evolve, alignment deviations, such as alignment of the tape reel assembly relative to the tape reel opening in the housing, are less tolerable. Therefore, a need exists for a data storage tape cartridge configured to prevent transverse movement of the tape reel assembly in a locked state.

SUMMARY OF THE INVENTION

One aspect of the present invention relates to a data storage tape cartridge including a housing, a tape reel assembly, a brake body, a spring, and a storage tape. The housing includes a base and a cover that combine to define an enclosed space. The base forms a tape reel opening, whereas the cover forms a post opposite the tape reel opening. The tape reel assembly is rotatably disposed within the enclosed space and includes a hub, opposing top and bottom flange components, brake teeth, and an inner surface. The hub defines a tape-winding surface. The opposing upper and lower flange components extend radially from opposite ends of the hub, respectively. The brake teeth extend axially inwardly relative to the upper flange component. Finally, the inner surface is formed by the tape reel assembly and defines an engagement section apart from the brake teeth. The brake body includes a stem, a head, a toothed section, and a centering feature. The stem is configured to be slidably mounted to the post formed by the cover. The head extends axially relative to the stem. The toothed section is formed at a surface of the head opposite the stem. In this regard, the toothed section corresponds with the brake teeth of the tape reel assembly. The centering feature extends radially outwardly from the head and forms a circumferential edge that is radially spaced from the toothed section. The spring is positioned about the post to bias the brake body to a locked state. In the locked state, the toothed section engages the brake teeth to prevent rotation of the tape reel assembly. Further, in the locked state, the circumferential edge of the centering feature contacts the engagement section of the tape reel assembly to support the tape reel assembly in a centered position relative to the tape reel opening. Finally, the storage tape is wound about the tape-winding surface of the hub. With this configuration, interaction between the circumferential edge and the engagement section limits lateral shifting of the tape reel assembly relative to the tape reel opening when the data storage tape cartridge is vertically oriented.

Another aspect of the present invention relates to a brake body for use with the data storage tape cartridge to selectively maintain a tape reel assembly in a locked state. The brake body comprises a stem, a head, a circular ring of teeth, and a flange. The stem forms a passage for slidably mounting to a post. The stem terminates in a trailing end. The head extends in an axial fashion opposite the trailing end of the stem. In this regard, the head has a diameter greater than an outer dimension of the stem. The circular ring of teeth is formed at an upper surface of the head and define an outer diameter. Finally, the flange extends radially from the head and terminates in a circumferential edge. In this regard, the circumferential edge has a diameter greater than the outer diameter defined by the ring of teeth. In one preferred embodiment, the circumferential edge has a tapered axial extension. With this configuration, the brake body engages a tape reel assembly both at the teeth and the circumferential edge.

Yet another aspect of the present invention relates to a method of supporting a tape reel assembly in a center position relative to a tape reel opening in a housing of a data storage tape cartridge. The method includes providing the tape reel assembly with break teeth and an inner surface with an engagement section apart from the brake teeth. A brake assembly is provided as including a brake body forming a toothed section and a circumferential edge radial spaced from the toothed section. The brake assembly is biased to a locked state in which the toothed section engages the brake teeth to impede rotation of the tape reel assembly and the circumferential edge contacts the engagement section. With this method, upon articulation of the data storage tape cartridge from a horizontal orientation, the brake body prevents lateral displacement of the tape reel assembly relative to the tape reel opening in the locked state via contact between the circumferential edge and the engagement section.

BRIEF DESCRIPTION OF THE DRAWINGS

FIG. 5A is a cross-sectional view of the data storage tape cartridge of claim 1 incorporating the components of FIGS. 2 and 4A in an unlocked state; and FIG. 5B is a cross-sectional view of the data storage tape cartridge of FIG. 5A in a locked state.

DETAILED DESCRIPTION OF THE PREFERRED EMBODIMENTS

Figure 1:
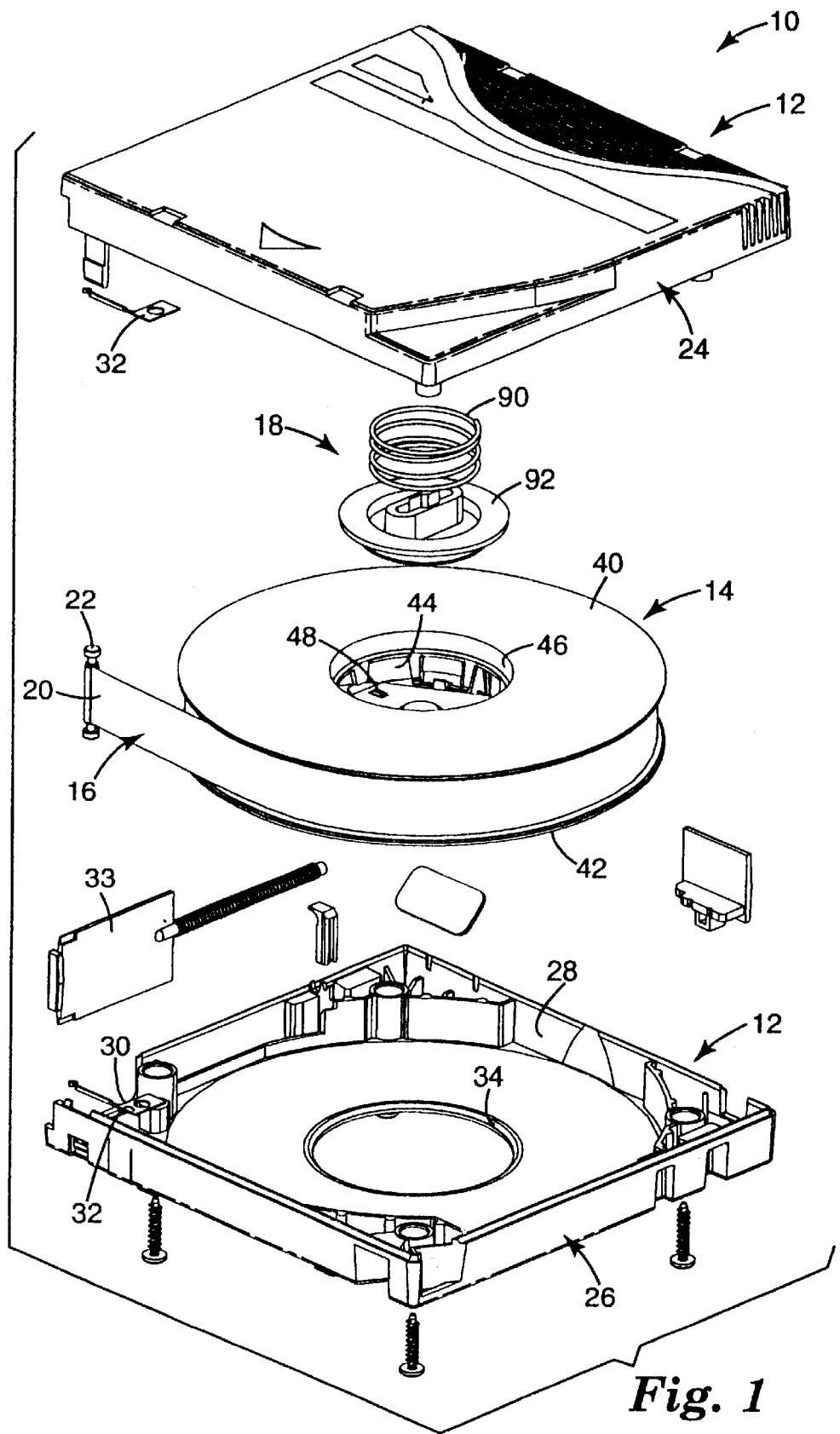
FIG. 1 is an exploded, perspective view of a data storage tape cartridge in accordance with the present invention.

One preferred embodiment of a data storage tape cartridge 10 is shown in FIG. 1. Generally speaking, the data storage tape cartridge 10 includes a housing 12, at least one tape reel assembly 14, a storage tape 16, and a brake assembly 18. The tape reel assembly 14 is rotatably disposed within the housing 12. The storage tape 16, in turn, is wound about a portion of the tape reel assembly 14 and includes a free-end 20 attached to a pin 22. Finally, the brake assembly 18 is centrally positioned within a portion of the tape reel assembly 14 and is connected to a portion (not shown) of the housing 12.

The housing 12 is sized in accordance with industry-accepted tape drive form factors, and is preferably generally square. Alternatively, other shapes such as rectangular are equally acceptable. The housing 12 is defined by a first housing section 24 and a second housing section 26. In one preferred embodiment, the first housing section 24 provides a cover, whereas the second housing section 26 serves as a base. It should be understood that as used throughout this specification, directional terminology, such as "cover," "base," "upper," "lower," "top," "bottom," etc., are used for purposes of illustration only, and are in no way limiting.

The first and second housing sections 24 and 26 are configured to be reciprocally mated to one another to define an enclosed space 28 (shown generally in FIG. 1) for maintaining various other components of the data storage tape cartridge 10. For example, the housing 12 forms an exit window 30 that, in conjunction with a pin retention device 32, is configured to hold the pin 22 and serves as an opening for the storage tape 16 to exit from the enclosed space 28. Upon opening of a door mechanism 33, the storage tape 16 can be threaded to a tape drive (not shown) when the pin 22 is removed from the exit window 30. Conversely, when the pin 22 is fastened to the retention device 32 and the door mechanism 33 is closed, the exit window 30 is covered.

In addition to the exit window 30, the second housing section 26 further forms a tape reel opening 34. The tape reel opening 34 provides access to the enclosed space 28, and in particular, the tape reel assembly 14, by a drive chuck portion of a tape drive (not shown).

The first housing section 24 includes a connector (not shown) extending from an inner surface thereof. The connector is positioned opposite the tape reel opening 34 and is configured to retain a portion of the brake assembly 18. As is known to those of ordinary skill in the art, in one preferred embodiment, the connector is a post sized to slidably receive a portion of the brake assembly 18. Alternatively, the connector may assume other forms known in the art, such as a series of teeth.

The pin 22 is a well-known component, preferably assuming a dumbbell shape. The pin 22 is sized to selectively engage the pin retention device 32, as well as to be engaged by an automatic threading apparatus of a tape drive (not shown). Alternatively, the pin 22 can be a leader block, as known in the art. Even further, depending upon a desired configuration of the data storage tape cartridge 10, the pin 22 may be eliminated, such as with a dual tape reel design.

The storage tape 16 is preferably a magnetic tape of a type commonly known in the art. For example, the storage tape 16 can consist of a balanced polyethylene naphthalate (PEN) based material coated on one side with a layer of magnetic material dispersed within a suitable binder system, and on the other side with a conductive material dispersed within a suitable binder system. Acceptable magnetic tape is available, for example, from Imation Corp. of Oakdale, Minn.

The tape reel assembly 14 generally includes an upper flange component 40, a lower flange component 42 and a hub body 44 (partially hidden in FIG. 1). The storage tape 16 is wound about a tape-winding surface (not shown) of the hub body 44 and is constrained laterally by the flange components 40, 42. Further, the tape reel assembly 14 defines a central opening 46 sized to receive the brake assembly 18. Brake teeth 48 are formed radially within the hub 44, and are sized to selectively engage a corresponding portion of the brake assembly 18, as described below. Further, although not shown, the tape reel assembly forms drive teeth extending axially outwardly relative to the lower flange component 42 for engagement by a tape drive chuck (not shown). Upon final assembly, the central opening 46 is axially aligned with the tape reel opening 34 in the housing 12.

Figure 2:
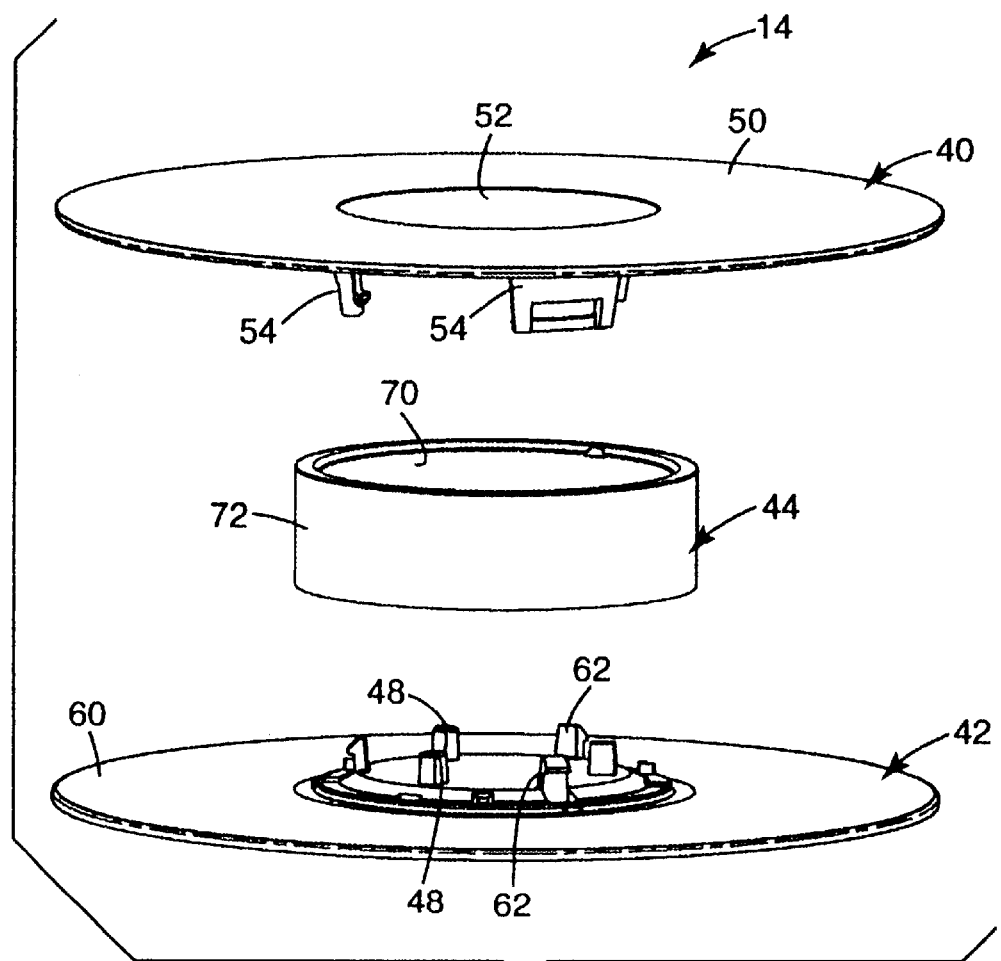
FIG. 2 is an exploded, perspective view of a tape reel assembly portion of the cartridge of FIG. 1.

One preferred embodiment of the tape reel assembly 14 is shown in greater detail in FIG. 2. Once again, the tape reel assembly 14 includes the upper flange component 40, the lower flange component 42, and the hub 44. The upper flange component 40 includes a top plate 50, a rim 52, and loop members 54. Conversely, the lower flange component 42 includes a bottom plate 60, legs 62, and forms the brake teeth 48. Although not shown in FIG. 2, the lower flange component 42 further forms drive teeth along the side opposite the brake teeth 48. Finally, the hub 44 is preferably a cylindrical ring defining an interior surface 70 and an exterior tape-winding surface 72.

The loop members 54 and the legs 62 are positioned, relative to a central axis defined by the hub 44, at a radius less than a radius defined by the interior surface 70 of the hub 44. Thus, construction of the tape reel assembly 18 includes coaxially positioning the upper and lower flange components 40, 42 at opposite sides of the hub 44 as shown in FIG. 2. More particularly, the upper and lower flange components 40, 42 are directed toward one another such that respective ones of the loop members 54 engage respective ones of the legs 62. In one preferred embodiment, a snap-fit is achieved between the loop members 54 and the legs 62, respectively. Regardless, interaction between the loop members 54 and the legs 62 secures the upper and lower flange components 40, 42 relative to the hub 44.

Figure 3:
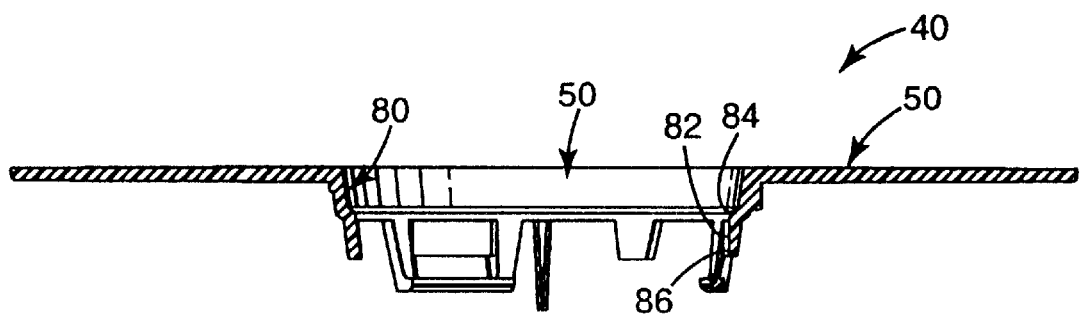
FIG. 3 is a cross-sectional view of an upper flange portion of the tape reel assembly of FIG. 2.

With the above-described construction, the rim 52 of the upper flange component 40 defines an inner surface of the tape reel assembly 14. In this regard, FIG. 3 illustrates the upper flange component 40 in greater detail. The rim 52 defines an inner surface 80 that forms an engagement section 82 (referenced generally in FIG. 3). As a point of clarification, the term "inner surface" is relative to the central opening 46 (FIG. 1) defined by the tape reel assembly 14 (FIG. 2), whereby the "inner surface" is the surface defining the smallest radius in the region of the central opening 46. With this in mind, with the one preferred embodiment illustrated, the upper flange component 40 provides the "inner surface".

In one preferred embodiment, the inner surface 80 tapers radially inwardly in axial extension from the top plate 50, with the engagement section 82 having a corresponding taper. Alternatively, the inner surface 80 can be substantially linear in axial extension, with only the engagement section 82 forming the above-described taper. Regardless, the engagement section 82 is configured such that a first portion 84 has a diameter greater than that of a second portion 86, with the first portion 84 being closer to the top plate 50 than the second portion 86.

While the inner surface 80, and in particular the engagement section 82, has been described as being formed by the upper flange component 40, the tape reel assembly 14 can be configured such that these features are provided by other components. For example, and returning to FIG. 2 the tape reel assembly 14 can be designed such that the lower flange component 42 defines the inner surface 80 and the engagement section 82. Alternatively, the tape reel assembly 14 can be formed such that the upper and lower flange components 40, 42 are secured to the hub 44 without the loop members 54 and the legs 62. With this approach, the interior surface 70 of the hub 44 provides the inner surface that, in turn, is formed to provide the tapered engagement section 82.

Returning to FIG. 1, the brake assembly 18 preferably consists of a spring 90 and a brake body 92. The spring 90 is preferably a coil spring formed to bias the brake body 92 within the central opening 46 of the tape reel assembly 14. In this regard, the brake body 92 is configured to engage the tape reel assembly 14 in a "locked" state, as described below.

Figure 4A:
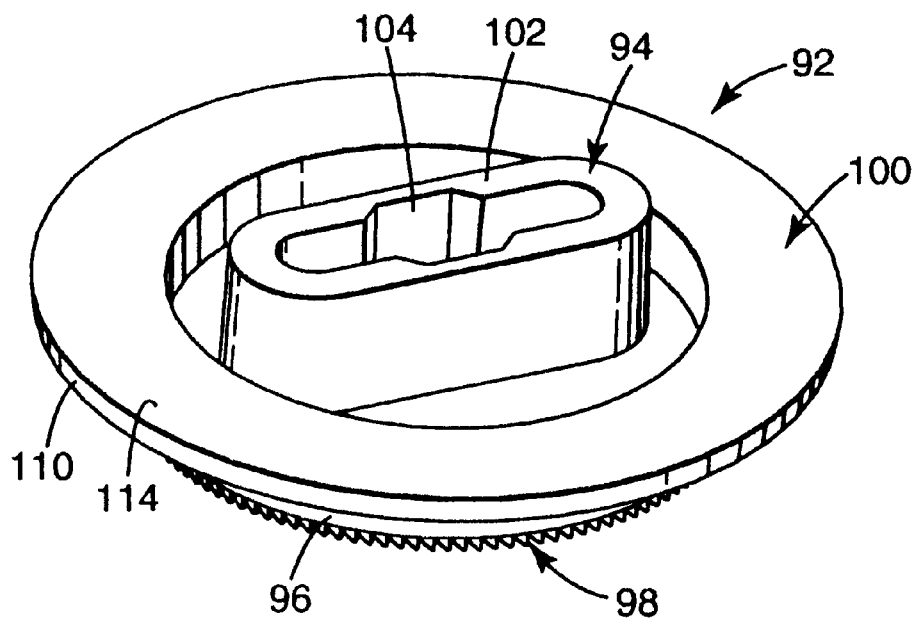
FIG. 4A is an enlarged, top perspective view of a brake body portion of the cartridge of FIG. 1.
Figure 4B:
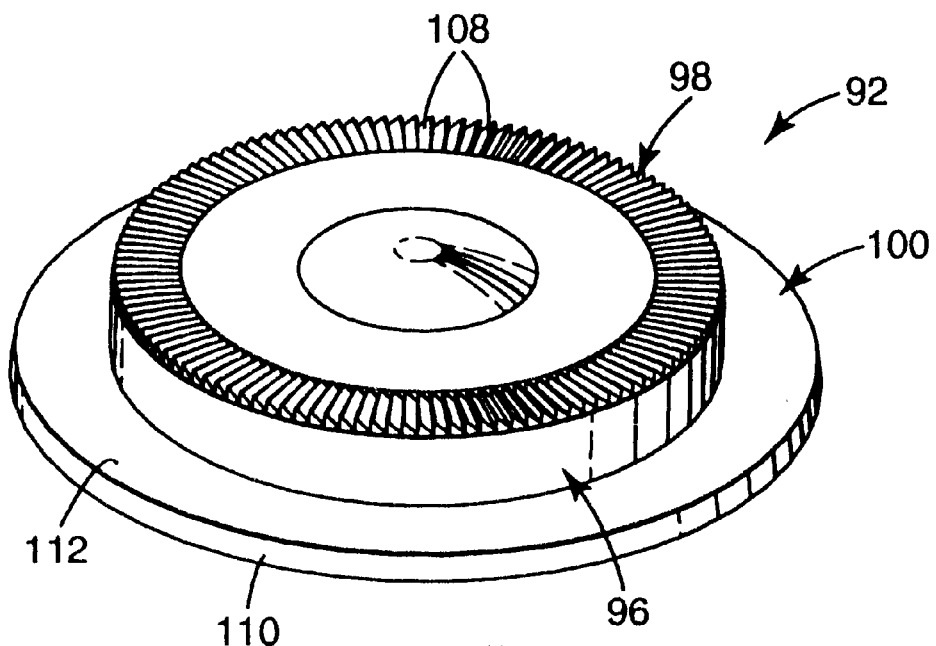
FIG. 4B is an enlarged, bottom perspective view of the brake body of FIG. 4A.

With specific reference to FIGS. 4A and 4B, the brake body 92 includes a stem 94, a head 96, a toothed section 98, and a centering feature 100. In general terms, the head 96 extends axially from the stem 94 and forms the toothed section 98 opposite a trailing end 102 of the stem 94. The centering feature 100 extends in a radial fashion from the head 96.

The stem 94 is configured to be slidably mounted to the post formed by the cover 24 (FIG. 1). In this regard, the stem 94 forms a passage 104 sized in accordance with the post. In this regard, the passage 104 is formed to provide limited clearance about the post, such that upon final assembly, the brake body 92 will not shift relative to the post.

The head 96 extends in an axial fashion relative to the stem 94 and defines a diameter greater than an outer dimension of the stem 94. With this configuration, a spacing is generated between the head 96 and the stem 94. The spacing is sized to receive a portion of the spring 90 (FIG. 1).

In a preferred embodiment, the toothed section 98 is formed by an upper surface of the head 96 (relative to the orientation of FIG. 4B), and is preferably a circular ring of teeth. Alternatively, the toothed section 98 can be formed as a plurality of intermittently spaced teeth. Regardless, the toothed section 98 is sized in accordance with the brake teeth 48 (FIG. 2) formed by the tape reel assembly 14 (FIG. 2) such that the toothed section 98 selectively engages the brake teeth 48. As shown in FIG. 4B, teeth 108 formed by the toothed section 98 extend in axial fashion relative to a central axis of the brake body 92. In a preferred embodiment, the toothed section 98 has an outer diameter contiguous with an outer diameter of a remainder of the head 96. Alternatively, the head 96 may be tapered such that the outer diameter of the toothed section 98 is greater or less than that of the remainder of the head 96.

The centering feature 100 is preferably a flange extending radially from the head 96 opposite the toothed section 98. The centering feature 100 terminates in or forms a circumferential edge 110. The circumferential edge 110 is configured to selectively contact a corresponding portion of the tape reel assembly 14 (FIG. 2) as described in greater detail below. In other words, interaction between the tape reel assembly 14 and the circumferential edge 110 is separate from the engagement provided by the toothed section 98. To this end, the circumferential edge 110 is radially spaced from the toothed section 98. Stated otherwise, the circumferential edge 110 defines a diameter that is greater than the outer diameter of the toothed section 98. In one preferred embodiment, the diameter of the circumferential edge 110 is at least 1.25 times greater than the outer diameter of the toothed section 98. Further, in the one preferred embodiment, the circumferential edge 110 is axially spaced from the toothed section 98.

In addition to being spaced apart from the toothed section 98, in a preferred embodiment, the circumferential edge 110 is tapered relative to a central axis of the brake body 92. As illustrated more clearly below, the preferred taper of the circumferential edge 110 approximates or corresponds with a taper of the engagement section 82 (FIG. 3) of the tape reel assembly 14 (FIG. 2). In general terms, the circumferential edge 110 expands radially in upward axial extension. Stated otherwise, the centering feature 100 is defined by an inner face 112 (FIG. 4B) and an outer face 114 (FIG. 4A). With this orientation in mind, the circumferential edge 110 preferably tapers such that a diameter of the circumferential edge 110 at the inner face 112 is greater than a diameter of the circumferential edge 110 at the outer face 114. In one preferred embodiment, the diameter of the circumferential edge 110 at the inner face 112 is 1.321 inches; whereas a diameter of the circumferential edge 112 at the outer face 114 is 1.334 inches, although other dimensions are equally acceptable.

FIGS. 5A and 5B illustrate interaction between the brake body 92 and the tape reel assembly 14 upon final assembly of the data storage tape cartridge 10. In particular, FIG. 5A illustrates the tape reel assembly 14 and the brake assembly 18 in an "unlocked" state, such as when the tape reel assembly 14 has been engaged by a tape drive chuck (not shown). Conversely, FIG. 5B illustrates the data storage tape cartridge 10 is a "locked" state, such as when the data storage tape cartridge 10 is not in use.

With specific reference to FIG. 5A, the brake assembly 18, and in particular, the brake body 92, is shown as being slidably secured to the post 120 formed by the cover 24 of the housing 12. The brake body 92 is further coaxially received within the central opening 46 of the tape reel assembly 14. Finally, the tape reel assembly 14 is axially aligned with the tape reel opening 34 formed by the base 26. As shown in FIG. 5A, the tape reel assembly 14 is retracted relative to the base 26, such that the brake body 92 is disengaged from the tape reel assembly 14. In particular, the toothed section 98 formed by the brake body 92 is not connected to, or otherwise engaged with, the brake teeth 48 formed by the tape reel assembly 14. Further, the circumferential edge 110 of the brake body 92 does not contact or otherwise engage the engagement section 82 provided by the tape reel assembly 14. Instead and otherwise, the circumferential edge 110 is radially spaced from the inner surface 80 of the tape reel assembly 14. In this unlocked state, the tape reel assembly 14 is free to be driven in a rotary fashion via the tape drive chuck (not shown).

Conversely, in FIG. 5B, the spring 90 biases the brake body 92 against the tape reel assembly 14. In one preferred embodiment, the upper flange component 40 forms an angle protrusion 122, whereas the base 26 forms a chamfered edge 124. With this one preferred embodiment, as the tape reel assembly 14 is transitioned from the unlocked state of FIG. 5A to the locked state of FIG. 5B, the angle protrusion 122 contacts the chamfered edge 124 to generally guide the tape reel assembly 14 to a coaxially aligned position relative to the tape reel opening 34. Regardless, in the locked state, the toothed section 98 of the brake body 92 engages the brake teeth 48 of the tape reel assembly 14. The brake body 92 remains mounted to the post 120 such that in the locked state, the brake body 92 prevents rotation of the tape reel assembly via engagement between the teeth 48, 98. Further, the circumferential edge 110 of the brake body 92 contacts the engagement section 82 of the tape reel assembly 14. As shown in FIG. 5B, a preferred taper of the circumferential edge 110 approximates a taper of the engagement section 82 such that a relatively uniform "wedge-type" contact is achieved between the circumferential edge 110 and the engagement section 82. Preferably, however, there is a finite amount of clearance such that the circumferential edge 110 does not become frictionally secured to the tape reel assembly 14. For example, in one preferred embodiment, a clearance of 0.007 inch radially (0.014 inch diametrically) is provided. Thus, the brake body 92 is easily transitioned away from the tape reel assembly 14 and back to the unlocked state (FIG. 5A) during subsequent use within a tape drive (now shown). Regardless, in the locked state, the brake body 92 supports the tape reel assembly 14 via contact between the circumferential edge 110 and the engagement section 82, such that the tape reel assembly 14 will not laterally move or shift relative to the tape reel opening 34 when the data storage tape cartridge 10 is moved or otherwise articulated from the horizontal orientation of FIGS. 5A and 5B.

The data storage tape cartridge and associated brake body of the present invention provides a marked improvement over previous designs. In particular, the brake body and the at least one tape reel assembly are provided with corresponding surfaces in the form of an engagement section of the tape reel assembly and a circumferential edge of the brake body. These features are configured and positioned relative to a tape reel opening formed in the base portion of the housing so as to prevent the tape reel assembly from becoming laterally displaced during handling and/or storage operations.

Although the present invention has been described with respect to preferred embodiments, workers skilled in the art will recognize that changes can be made in form and detail without departing from the spirit and scope of the present invention. For example, the data storage tape cartridge has been described with reference to a single-reel design. Alternatively, the disclosed embodiments can be incorporated into a dual-reel data storage tape cartridge. Further, a wide variety of other known tape reel assembly constructions are available to serve generally as the tape reel assembly, in which case the inner surface is altered pursuant to the present invention to provide the novel engagement section.

What is claimed is:

1. A data storage tape cartridge comprising:
   a housing including a base and a cover combining to define an enclosed space, the base forming a tape reel opening and the cover forming a post opposite the tape reel opening;
   a tape reel assembly rotatably disposed within the enclosed space, the tape reel assembly including:
     a hub defining a tape-winding surface,
     opposing upper and lower flange components extending radially from opposite ends of the hub, respectively,
     brake teeth extending inwardly relative to the upper flange component,
     wherein the tape reel assembly has an inner surface defining an engagement section apart from the brake teeth;

a brake body including:
  a stem configured to be slidably mounted to the post,
  a head extending axially relative to the stem,
  a toothed section formed at a surface of the head opposite the stem, the toothed section corresponding with the brake teeth of the tape reel assembly,
  a centering feature extending radially outwardly from the head, the centering feature forming a circumferential edge that is radially spaced from the toothed section,
a spring biasing the brake body to a locked state in which the toothed section engages the brake teeth to prevent rotation of the tape reel assembly, and the circumferential edge contacts the engagement section to support the tape reel assembly in a center position relative to the tape reel opening; and
a storage tape wound about the tape-winding surface.

2. The data storage tape cartridge of claim 1, wherein the brake body and the tape reel assembly are configured such that in an unlocked state the circumferential edge is radially spaced from the inner surface.

3. The data storage tape cartridge of claim 1, wherein an interface between the circumferential edge and the engagement section in the locked state limits lateral movement of the tape reel assembly relative to the tape reel opening.

4. The data storage tape cartridge of claim 1, wherein the engagement section is tapered relative to a central axis defined by the hub.

5. The data storage tape cartridge of claim 4, wherein the upper flange component defines a top face of the tape reel assembly, and further wherein the engagement section has an upper portion and a lower portion, the upper portion being closer to the top face than the lower portion, and further wherein a diameter of the engagement section at the lower portion is less than a diameter of the engagement section at the upper portion.

6. The data storage tape cartridge of claim 4, wherein the upper flange component defines a top face of the tape reel assembly, and further wherein a downward extension of the engagement section relative to the top face is defined by a radially inward taper.

7. The data storage tape cartridge of claim 4, wherein the upper flange component forms the engagement section of the tape reel assembly.

8. The data storage tape cartridge of claim 4, wherein the circumferential edge of the brake body is tapered relative to a central axis of the brake body.

9. The data storage tape cartridge of claim 8, wherein a taper of the circumferential edge approximates a taper of the engagement section.

10. The data storage tape cartridge of claim 9, wherein the circumferential edge and the engagement section define slightly different tapers.

11. The data storage tape cartridge of claim 1, wherein the circumferential edge is axially spaced from the toothed section.

12. The data storage tape cartridge of claim 1, wherein the centering feature has an inner face and an outer face, the inner face being closer to the toothed section than the outer face, and further wherein a diameter of the circumferential edge at the inner face is greater than a diameter of the circumferential edge at the outer face.

* * * * *